United States Patent [19]
Giberson

[11] Patent Number: 5,505,662
[45] Date of Patent: Apr. 9, 1996

[54] QUICK DISCONNECT

[76] Inventor: Melbourne F. Giberson, 5 Spring Mill La., Haverford, Pa. 19041

[21] Appl. No.: 155,389

[22] Filed: Nov. 22, 1993

[51] Int. Cl.⁶ ........................................... F16D 3/18
[52] U.S. Cl. .................... 464/156; 403/DIG. 4; 464/901
[58] Field of Search .................... 464/901, 156, 464/155; 403/DIG. 4, 322, 321

[56] References Cited

U.S. PATENT DOCUMENTS

| | | | |
|---|---|---|---|
| 2,375,030 | 5/1945 | O'Malley | 464/155 X |
| 2,731,185 | 1/1956 | Ranney et al. | 464/155 X |
| 4,443,205 | 4/1984 | Grant | 464/156 X |
| 4,472,160 | 9/1984 | Wright | 464/156 |
| 4,530,674 | 7/1985 | Rauch | 464/155 X |
| 4,990,121 | 2/1991 | Vosbeck et al. | 464/156 X |

*Primary Examiner*—Daniel P. Stodola
*Assistant Examiner*—Eileen A. Dunn
*Attorney, Agent, or Firm*—Polster, Lieder, Woodruff & Lucchesi

[57] ABSTRACT

In a quick disconnect between a driving shaft and a driven shaft, in which a first annular bracket is mounted on an end of the driving shaft and a second annular bracket is mounted on an end of the driven shaft facing the first bracket but spaced substantially from the first bracket, each of the brackets having radially inwardly, axially extending splines, and a spool having annular flanges at each axial end extending radially outwardly and having radially outwardly extending splines complementary to the inwardly extending bracket splines, the spool having an annular channel defined by spaced radially outwardly extending annular walls, a yoke is provided having two substantially diametrically opposite, radially outwardly extending arms and a roller-carrying section connected to the arms, the roller-carrying section extending around the channel and extending radially between the channel walls and carrying two, diametrically opposed rollers within the channel the rollers projecting axially beyond sides of the roller-carrying section to permit the rollers selectively to be forced into engagement with one or the other of the channel-defining walls, the arms extending radially beyond the reach of the brackets, and the arms being operatively connected to spool shifting cylinder and piston assemblies, the cylinder and piston assemblies being positioned radially outboard of the brackets.

15 Claims, 5 Drawing Sheets

QUICK DISCONNECT

BACKGROUND OF THE INVENTION

This invention has to do with an improvement to the existing spool-type quick disconnect of the type positioned between a large driving shaft, as, for example, the shaft of a turbine-generator, or motor, and a driven shaft, as of a fluid drive or boiler feed pump. Conventionally, an annular bracket is bolted or otherwise secured to the end of a driving shaft. The bracket has the form of a ring with internal splines extending radially inwardly, and a co-axially extending ring of larger internal diameter, with a radially inwardly projecting lip at its end, and with no splines.

The driven shaft is also provided with an annular bracket in the form of a ring with radially inwardly extending splines, extending the full axial length of the ring. The driven shaft bracket also has a radially inwardly extending lip around an end of the bracket facing the driving shaft bracket.

A spool has flanges at both ends which are splined complementarily to the splines of the two brackets and is mounted to extend between the two brackets with the flanges of the spool engaged with the splines of the brackets in the normal, running condition. The spool has an annular channel defined by radially outwardly extending walls, in which rollers are positioned, by which the spool is shifted axially to bring the flange of the driving end of the spool into the splineless area of the driving shaft bracket, thus disconnecting the driving shaft from the driven shaft. In the conventional arrangement, there are two separate but identical roller, stub shaft, piston and double acting cylinder assemblies, located on diametrically opposite sides of the spool. In each of these assemblies, the double acting cylinders are fixedly attached to a stationary housing on opposite ends of the piston, with the central axis of the piston parallel to the central axis of the spool. Only stationary housings or cowlings have been used heretofore. One end of the stub shaft is fixedly attached to the piston; a roller is rotatably mounted on the free end of the stub shaft and is positioned between the walls defining facing sides of the annular channel around the spool. The force required to move the spool out of engagement is great, and to reduce the moment applied to the piston by the forces on the roller while moving the spool, the stub shaft is made short. Accordingly, the cylinders have been positioned closely adjacent the channel, between the facing ends of the two annular brackets.

In order to accommodate these cylinders, the shaft-to-shaft end distance has had to be on the order of forty inches, as a minimum. This not only requires that the shafts be separated by over forty inches, but has made the spool correspondingly heavy.

Both the driving shaft and the driven shaft have thrust bearings at some distance from the quick disconnect device, which fix those axial points of the shafts. Thermal growth of the turbine shaft causes that end of the assembly to expand inwardly, up to 1 ¼ inches, for example. The quick disconnect has to be so made as to accommodate this expansion.

One of the objects of this invention is to provide a quick disconnect that permits the use of a shorter spool than those used heretofore for the same application.

Another object of this invention is to provide such a quick disconnect that is capable of operation in the case of the loss of alternating current (A.C.) power.

Other objects of this invention will be apparent to those skilled in the art in light of the following description and accompanying drawings.

SUMMARY OF INVENTION

In accordance with this invention, generally stated, in a spool-type quick disconnect system, wherein annular brackets are mounted on facing ends of a driving shaft and a driven shaft, the brackets having axially extending, radially inwardly projecting splines, as in a conventional spool-type quick disconnect system, and a spool, conventional in construction except for being substantially shorter axially than the conventional spool, means are provided for shifting the spool to shaft-disengaging position which include diametrically opposed rollers mounted in a yoke encircling a channel in which the rollers are positioned, i.e., extending around the channel and extending radially between the channel walls, the yoke having diametrically extending arms connected to be moved by fluid actuated cylinders that are positioned radially outboard of the brackets. In one embodiment of this invention, the housing around the quick disconnect is axially moveable in an amount on the order of the expansion of the shaft.

In the preferred embodiment, the fluid in the fluid actuated cylinders is an incompressible liquid hydraulic fluid, either a mineral oil or a synthetic hydraulic fluid, depending upon the degree of fire protection desired or required, wherein the hydraulic fluid is driven by an air operated motor, such as, for example, an intensifier or a master cylinder, which receives its power from air stored in a compressed air cylinder. The air cylinder is kept filled from the station air supply. Suitable valving is used to control the activation of the intensifier or master cylinder and to control which direction the cylinders operate. The intensifier or master cylinder is used to amplify the pressure, for example, from 100 psi air pressure to 2000 psi hydraulic pressure. In the preferred embodiment, a repeating intensifier is used, which recycles in response to low pressure in the hydraulic fluid line.

DESCRIPTION OF THE PREFERRED EMBODIMENT

Referring now to the drawings for one illustrative embodiment of quick disconnect of this invention, reference numeral 1 indicates the completed quick disconnect assembly. The assembly 1 extends between and is connected to a hub 3 on a driving shaft 4 such as a turbine shaft, and a hub 7 of a driven shaft 8 as shown particularly in FIG. 3. It includes an annular driving shaft bracket 10 made up of a ring gear 11 with a flange 12 mounted to the hub 3 of the turbine shaft, a radially flat face 13, and a spigot fit 13A for control of radial location, shown in detail in FIG. 3A. The gear 11 has radially inwardly extending teeth or splines 14 extending axially from the face of the flange 12 that abuts the hub 3 to an axially inboard face 13B.

Figure 3:
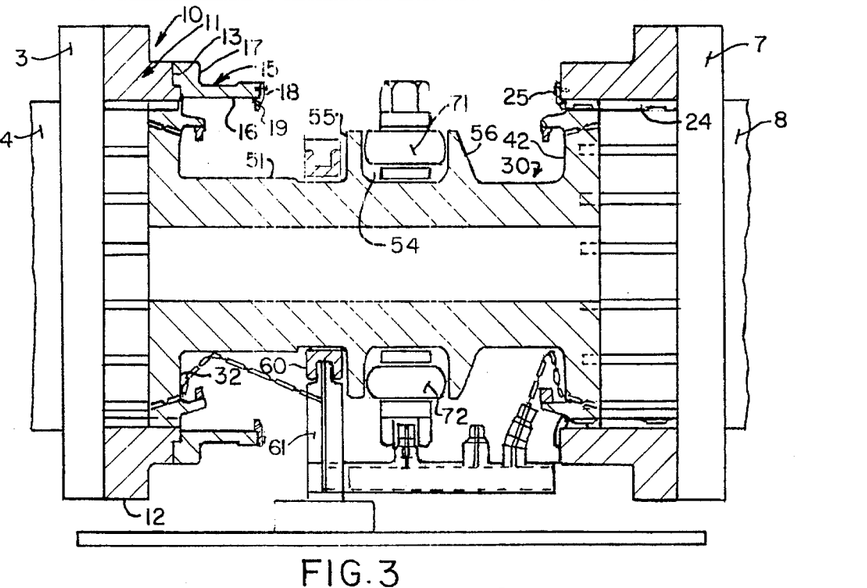
FIG. 3 is a view in side elevation, partly in section and partly broken away, of the device shown in FIGS. 1 and 2, with the yoke omitted, better to show the position of the rollers in the spool channel.
Figure 3A:
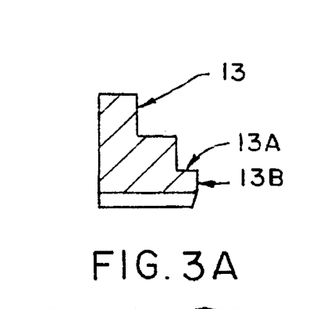
FIG. 3A is a fragmentary sectional view of a portion of a ring gear.
Figure 4:
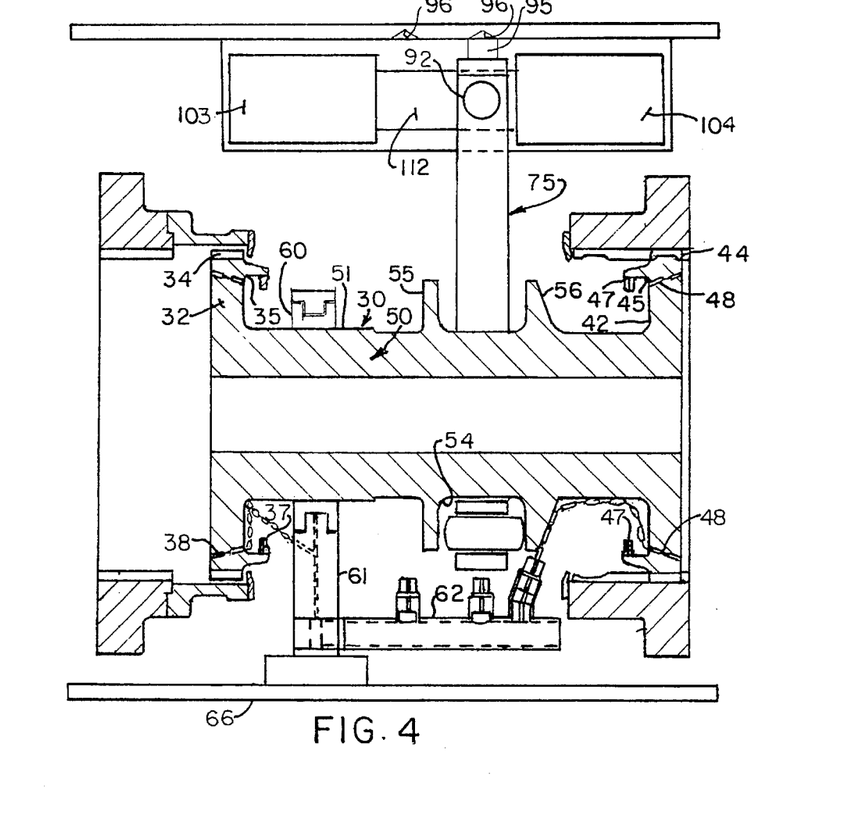
FIG. 4 is a sectional view take along the lines 4—4 of FIG. 2.

An inboard annular ring 15, has a smooth inner annular surface 16 of larger internal diameter than the outermost internal diameter of the grooves between the teeth or splines of the gear 11, a radially outwardly extending flange 17 at one end and a lip 18 at its other end. The flange 17 has a radially planar face that abuts the axially inboard face 13 of the ring gear 11 and is bolted or otherwise secured to that face, and a spigot fit that mates to the spigot fit 13A, as shown in FIGS. 3 and 4. The lip 18 is removably mounted to an axially inboard end of the ring 15, and projects radially inwardly from the smooth inner annular surface 16. The lip 18 has angularly drilled holes 19 through which lubricating oil exits.

The driven shaft also has a bracket mounted to its end, an annular driven shaft bracket 20. The bracket 20 has a ring gear 21 with a radially outwardly extending flange 22 with a radially planar face on its axially outboard side and an axially inboard face 23. The ring gear 21 has radially inwardly and axially extending splines 24, and a lip 25, identical to lip 18, removably mounted on the axially inboard face 23 and projecting radially inwardly from the radially inboard edge of the face 23. The splines 24 extend axially from the planar axially outboard surface of the flange 22 to the lip 25.

A spool 30 is mounted shiftably in and between the brackets 10 and 20. The spool 30 has a barrel section 50 with integral flanges or gear plates 32 and 42 extending radially outwardly at each end of the barrel. In the embodiment shown, the driving shaft end gear plate 32 has splines 34 complementary to the splines 14 of the driving shaft bracket ring gear 11. Radially inboardly of the splines 34, on the inboard face of the plate 32, the plate 32 has an axially inboardly extending annular shelf 35 with a radially inwardly extending oil ring 37 mounted at its axially inboard end, and oil passages 38 extending through the plate from a point slightly inward from the inner face of the shelf 35 to a point, radially farther outboard, at which they open through an axially outboard face of the plate 32.

The driven shaft end gear plate 42 has splines 44 complementary to the splines 24 of the driven shaft bracket gear ring 21. Like the driving shaft end flange gear 32, the driven shaft end flange gear 42 has a ledge 45 with an inwardly projecting oil ring 47 and oil passages 48.

Figure 3B:
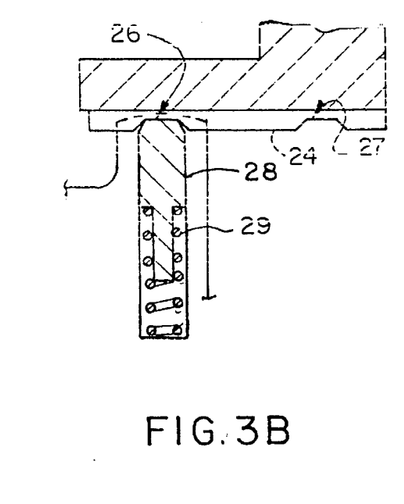
FIG. 3B is a fragmentary sectional view of a tooth of a ring gear with detent notches, and a spring-loaded detent carried by a spool.

Several, for example six, circumferentially equally spaced teeth of the splines 24 of the gear ring 21 contain two detent slots or pockets 26 and 27 axially separated by a distance, for example, of 2.5 inches. Slot or pocket 26 corresponds to the connected position and 27 to the disconnected position of the spool. All of the other teeth of the spline 24 are of uniform section from end to end, that is, without detent slots. The driven shaft end gear plate 42 has spring-detent seats or wells oriented radially, in which mating detent pins 28 and biasing springs 29, shown particularly in FIG. 3B, are seated. The detent pins are made of a composite construction with a steel shell surrounding a heavy metal core. These pins and springs are designed to provide for example, approximately 500 pounds of resistance at zero rotating speed, and at operating speed to permit no relative movement between spline teeth 24 and 44 due to axial movement (sliding) of teeth 14 through teeth 34 resulting from growth of the turbine shaft, even at full torque conditions.

The barrel 50 is cylindrical, with a section 51 of slightly greater diameter than the remainder of the barrel. The section 51 extends from the inboard face of the flange 32 to a place just short of a journal bearing 60 mounted on a bearing stand 61 when the spool is in the connected position, i.e., when the detent pin 28 is in slot 26. The bearing 60 is spaced from the barrel in normal operation, as shown in FIG. 3, and engages the thickened section 51 slidably when, as is explained hereinafter, the spool, hence the thickened section, moves toward the driven shaft, as shown in FIG. 4.

On the axial side of the bearing 60 nearer the driven shaft 8, the barrel has an annular channel 54 defined spaced radial facing surfaces of radially outwardly extending walls 55 and 56. The wall 55 is on the driving end side of the channel and the wall 56, on the driven end. The wall 55 is substantially uniform in thickness, while the wall 56 is buttressed to withstand greater side thrust, which occurs while disengaging at full speed and with torque, than the wall 55 experiences during engagement at no speed and no torque.

Except for the axial length of the spool 30, the construction of the disconnect to this point has been substantially conventional.

Figure 1:
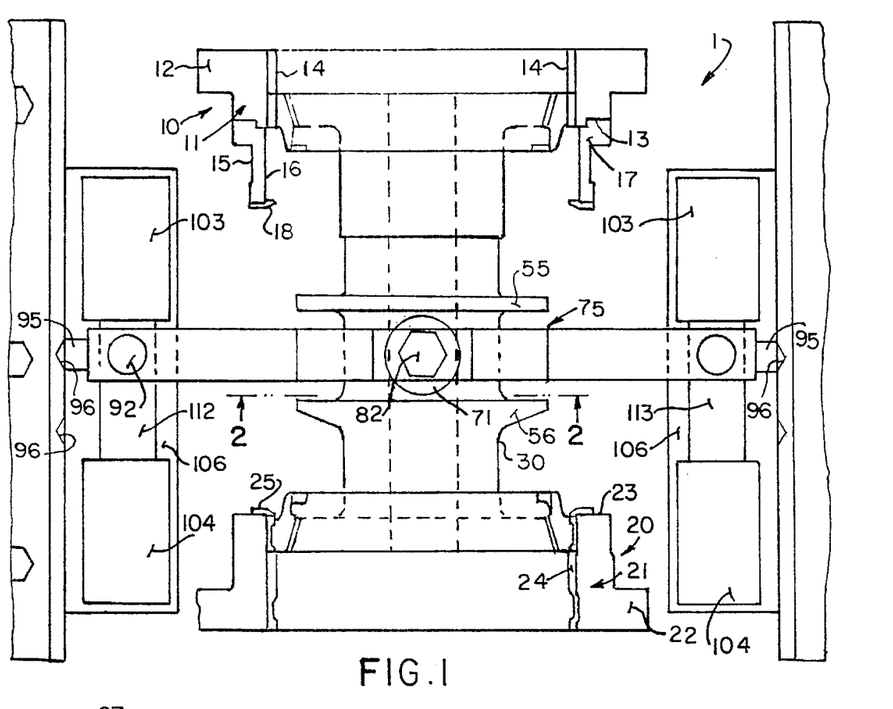
FIG. 1 is a top plan view, partly in section, of the essential elements of the disconnect of this invention.
Figure 2:
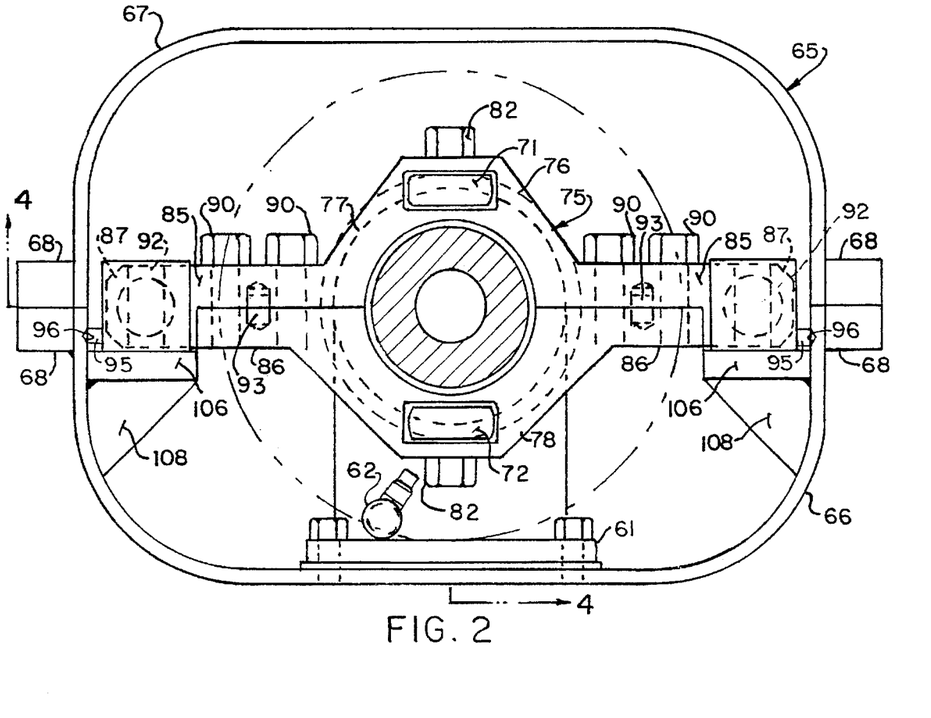
FIG. 2 is a view, partly in section in the direction indicated by the line 2—2 in FIG. 1.

In the embodiment here described and illustrated, the entire quick disconnect assembly is surrounded by a cowling 65, made up of a lower support shell 66 and an upper closure shell 67, the two shells being joined along opposite long edges by a pair of flanges 68, bolted together as shown in FIGS. 1 and 2. The lower shell 66 is secured to a base, and in turn carries the bearing stand 61, and oil fittings 62 from which oil is projected onto the various moving parts. The support shell 66 has substantially vertical side reaches, upon which, on their inside surfaces, platforms 106 are secured, supported and reinforced by gussets 108. The platforms 106 support cylinders 103 and 104, aligned to drive a piston 112 on one side and a piston 113 on the other. In this embodiment, the axial center lines of the pistons 112 and 113 are on a plane with the axial center line of the shafts 4 and 8 and barrel 50. Each of the pistons 112 and 113 has, intermediate its ends, a square, heavy block 150 and 152, respectively, integral with the piston, with a vertical passage 151 through it. Vertical passage 151 is a round hole with a slight clearance for a linch pin, as described in detail hereinafter.

Rollers 71 and 72, rotatably mounted on bearings with a vertical axis, are positioned within the channel 54, between the walls 55 and 56 but normally spaced from those walls during normal operation of power transmission, as shown particularly in FIGS. 1 and 3. The rollers 71 and 72 are carried in a yoke 75. The yoke 75 has a central body 76 made up of two semicircular sections 77 and 78. Each of the semicircular sections 77 and 78 has an open pocket in which the rollers 71 and 72 respectively are seated, the sections being substantially thinner than the diameter of the rollers, so that the rollers project from both sides, as shown particularly in FIGS. 1, 3 and 7. The rollers are mounted on ball bearings which are journaled on shanks of bolts 82. The thickness of the yoke 75, the width of the channel 54 and the diameter of the rollers 71 and 72 are designed so that if one piston lags the other, as shown in FIG. 7, the walls 55 and 56 of the channel 54 do not contact the yoke 75.

Figures 5, 6:
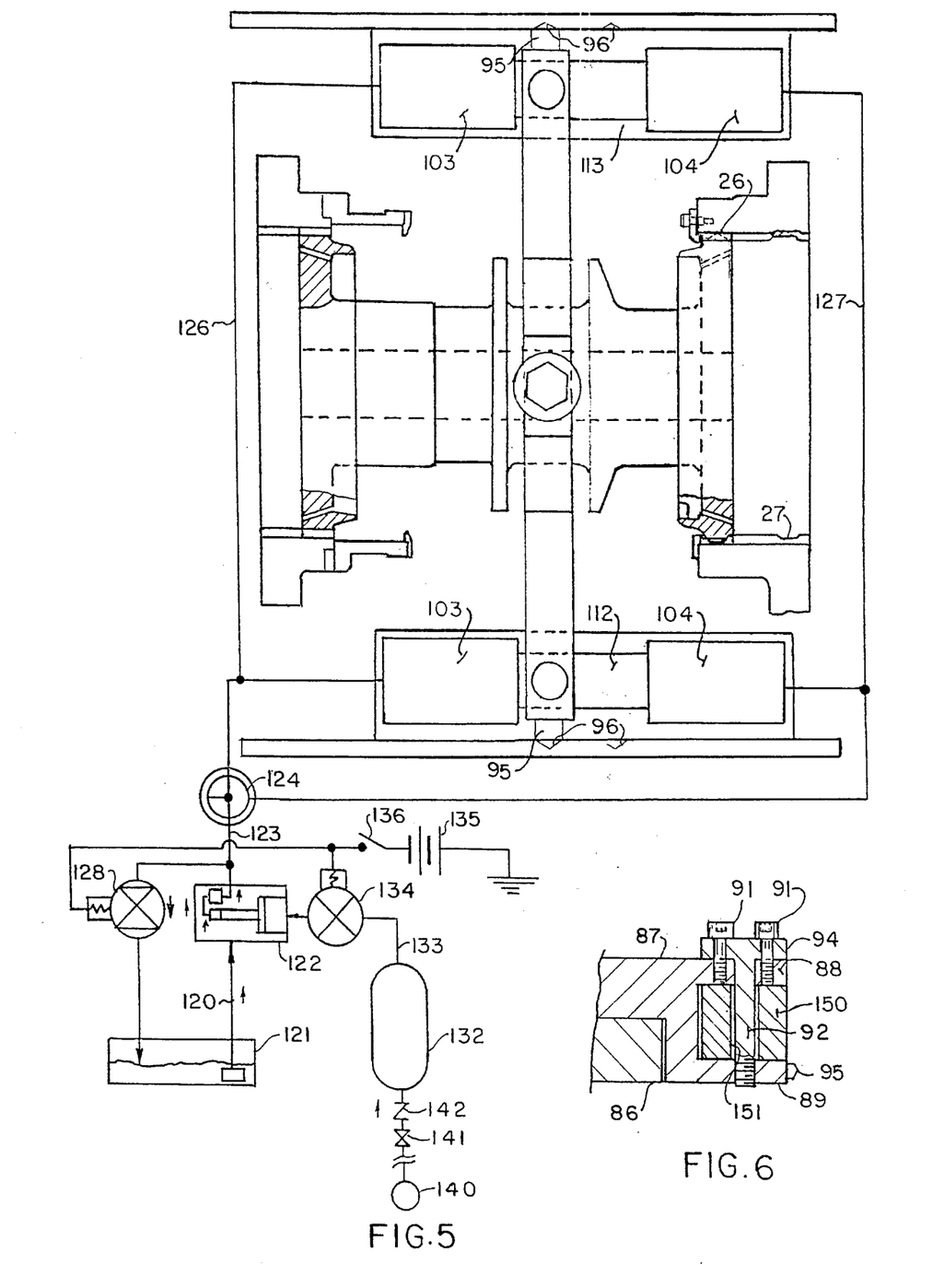
FIG. 5 is a view corresponding to FIG. 1 with a somewhat diagrammatic representation of the actuation system.
FIG. 6 is a somewhat enlarged fragmentary sectional view of an end of a yoke arm.
Figure 7:
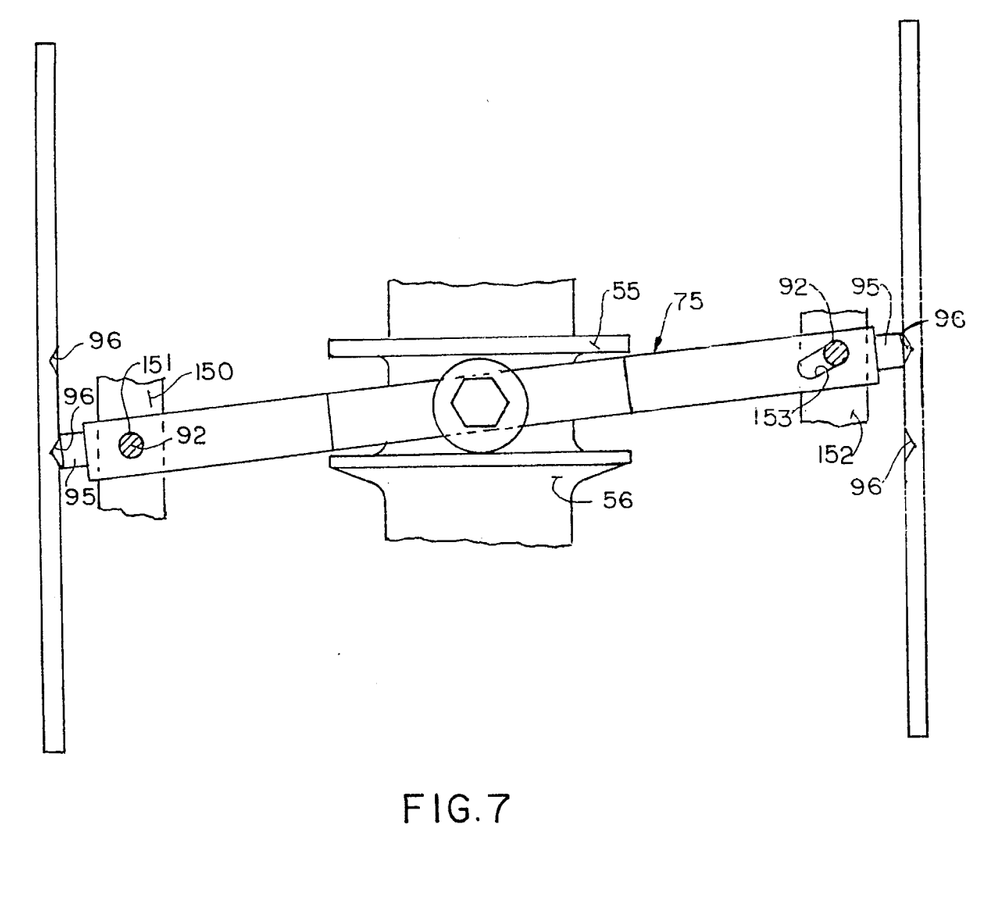
FIG. 7 is a somewhat diagramatic view of a yoke and spool arrangement in a position of misalignment.

In the embodiment shown in FIGS. 1–7, the section 77 has an arm 85 on each side, with a heavy channel section 87 at its outer end. The channel section 87 has an upper plate 88 and a lower plate 89, particularly shown in FIG. 6. The block 150 is embraced by the plates 88 and 89. The plates 88 and 89 have vertically aligned holes in them, aligned also with the passages 151 and 153 in the piston blocks 150 and 152, each to receive a linch pin 92. The linch pin 92 has, integral with it, a head bar 94 with holes in it aligned with tapped blind holes in the upper plate 88, to receive cap screws 91 to hold the linch pin 92 in place. As can be seen in FIG. 6, clearance is provided around the linch pin 92 and the wall defining the hole 151. As shown in FIG. 7, the hole 153 in block 152 takes the form of a slot. This is to accommodate the situation in which the movement of one of the pistons lags the other for some reason, the pistons being linked hydraulically but not mechanically. The lower plate 89 also has a spring detent seat in it, oriented perpendicularly to the long axis of the linch pin, with a detent 95 projecting therefrom and into detent keeper notches 96 in the wall of the shell 66, as shown in FIGS. 1, 2, 4, 5 and 7. The spacing of the notches 96 is the same as that of the detent slots 26 and 27 in the splines of the gear ring 21. The detent can be carried by the piston block 150, instead of one of the plates, if desired. The spool detents and the piston detents serve not only to maintain the spool in position with respect to the brackets, but to position the spool with respect to the rollers, so that the rollers are centered in the spool channel, spaced from the walls defining that channel when in normal operation. If the rollers were to engage a wall of the spool channel constantly, they would wear out very quickly, rotating as they would be at a substantial multiple of 3600 rpm in the case of a conventional turbine-generator.

The lower section 78 of the yoke 75 has shorter arms 86, tapped and threaded to receive stud bolts 90, extending from co-axial holes in the arms 85, as shown particularly in FIG. 2. Dowel pins 93 are used as locators as is clearly shown in FIG. 2. The platforms 106, cylinders 103 and 104, and pistons 112 and 113 are located radially outboard of the brackets 10 and 20. By so locating the driving cylinders, which is made possible by the use of the yoke 75 and the short bolts or studs 82, the axial length of the entire quick disconnect assembly can be reduced from approximately forty inches to the order of twenty inches. This not only permits the driving shaft and the driven shaft to be positioned much closer together, therefore conserving space, but it permits the reduction of weight of the spool, which reduces the weight of the rotating shafting, which increases the critical speeds and reduces unbalance, thereby improving the vibration response (reducing vibration amplitudes) of the shafting.

The quick disconnect is likely to be required when there is a loss of A.C. power. In the normal process of disconnecting, as when a turbine is to be shut down, the conventional method is to use an A.C. powered hydraulic pump. However, under some emergency conditions, A.C. power is not available, in which case the quick disconnect cannot be operated. This was the case in the systems known heretofore. Furthermore, if the operating pistons were hung up or a limit switch failed, the A. C. motor would continue to run against the pressure of the fluid in the system, and if a relief valve bypassed fluid, the motor is liable to burn up after a time.

In this embodiment, the disconnect system is provided with means to assure operation under either normal or emergency conditions, using compressed air power and direct current (D.C.) controls. A tank of compressed air 132 is supplied from a station air supply 140 through a block valve 141 and a check valve 142. The tank of compressed air 132, is connected to a solenoid operated valve 134 in line 133, the solenoid valve 134 being electrically connected selectively through a switch 136, to a D.C. source 135. Thus, in normal or emergency conditions the valve 134 can always be opened by using switch 136 and D.C. source 135, to supply compressed air through the line 133, to an intensifier 122 or to a master cylinder, whichever is used. The intensifier is the preferred embodiment. By using the intensifier, air at sixty pounds pressure can supply as much as three thousand pounds per square inch pressure to the hydraulic fluid. As has been indicated, preferably, the intensifier is of the repeating type, so that if for any reason, the pressure in the hydraulic fluid line is lower than a predetermined pressure, the intensifier will recycle. When an intensifier is used, it is essential to use a pressure release valve 128 that is operated by a switch 136 in parallel with valve 134, wherein the release valve 128 is closed when intensifier 122 is pumping. This embodiment shows a reservoir 121 at atmospheric pressure, and a suction line 120 to supply hydraulic fluid to the intensifier 122 which supplies high pressure hydraulic fluid through line 123 to the selector valve 124, and, depending upon the position of the selector valve 124, to cylinders 103 via tubes 126 or cylinders 104 via tubes 127.

When high pressure hydraulic fluid is supplied to the cylinders 103, the pistons 112 and 113 on either side are forced in the direction toward the driven shaft, causing the rollers 71 and 72 to engage the plane, facing surface of the wall 56, forcing the spool 30 in the direction of the driven shaft until the splines 34 of the flange 32 clear the splines 14 of the ring gear 11, as shown in FIG. 4. The enlarged area 51 of the barrel 50 is now journaled in the journal bearing 60, to keep the barrel aligned with the axis of the driving shaft and the driven shaft, and while the bracket 10 is rotating with the driving shaft, it is disconnected from the spool.

The spool can, of course, be disconnected while the two shafts are being driven. They cannot be reconnected when one of the shafts is rotating at high speed with respect to the other. The reconnecting is accomplished when the two shafts are motionless, or when the driving (turbine) shaft is on "turning gear", at a speed of approximately 3 rpm, and the driven shaft is at rest.

Figure 8:
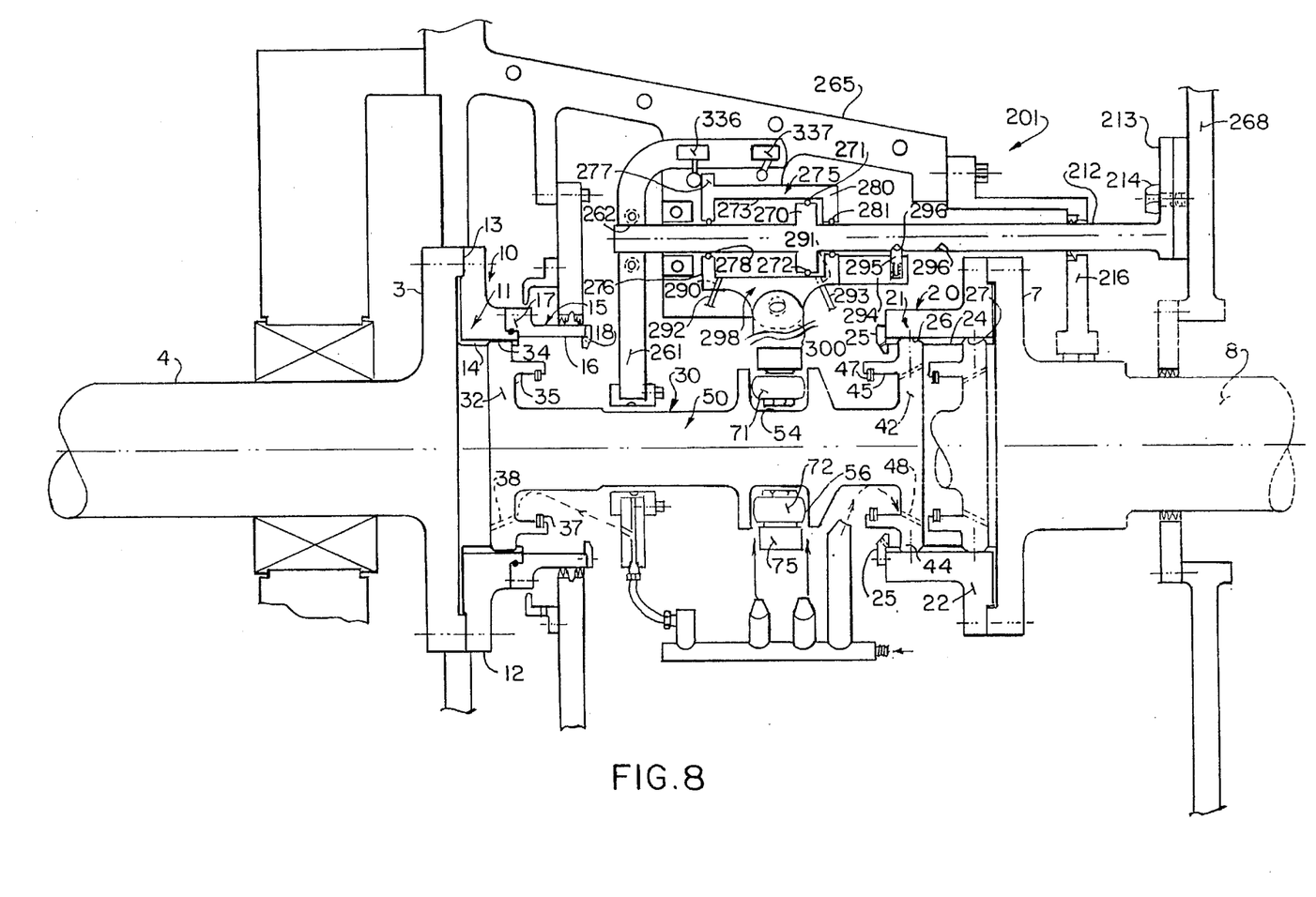
FIG. 8 is a view, partly in section and partly broken away, of another embodiment of quick disconnect of this invention.

Referring now to FIG. 8 for another embodiment of quick disconnect of this invention, reference numeral 201 indicates the completed quick disconnect assembly of this embodiment. The driving shaft 4 and driven shaft 8, the various elements that are connected to each, and the spool are all identical to those described in the first embodiment, and are given identical numbers. The difference between the embodiment shown in FIG. 8 and that shown in the first embodiment described is in the drive mechanism for the spool from connected to disconnected position. In this second embodiment, the piston is made stationary and the cylinder moves to force the spool 30 from one position to another, axially of the shafts 4 and 8. To this end, in addition to a cowling 265 that may slide axially, for example, up to 1 ¼ " toward the fixed structure 268 and that surrounds the quick disconnect, a fixed structure or frame 268 is provided to which piston rods 212 are bolted. In the embodiment shown, the piston rods 212 have at their outer ends an integral foot 213 through which bolts 214 extend into a tapped hole in a plate welded to the fixed frame 268. The piston rods 212 extend through holes in a radially extending axially end wall 216 of the cowling 265 and are mounted in openings 262 in a stand 261, corresponding to the stand 61 of the first embodiment. Intermediate the ends of the fixed piston rod 212, somewhat closer to the stand 261 than to the foot 213, is a fixed piston 270 provided with an annular channel 271 in which an 0 ring 272 is seated. The 0 ring 272 of each piston engages a cylindrical inner wall 273 of a moveable cylinder 275. The cylinder 275 has an inner end wall 276, which, in FIG. 8 is shown as being integral with the cylinder, but in practice, will be removably mounted so as to permit the assembly of the device. An actuator tab 277 extends radially outwardly from the wall 276. The wall 276 has a central passage in it, with an annular seat or groove to receive an 0 ring 278 that engages the outer surface of the piston rod 212 to seal the cylinder between the 0 ring 272 and the 0 ring 278. On the end of the cylinder 275 opposite the wall 276, is an annular end wall 280, which, like the wall 276 is provided with an opening for the piston rod, in which an annular 0 ring seat is provided in which an 0 ring 281 is seated to seal that portion of the cylinder between the 0 ring 281 and the 0 ring 271. Hydraulic fluid supply and exhaust ports 290 and 291 extend through the cylinder wall, on opposite sides of the piston 270, and are connected to hydraulic fluid pressure and exhaust lines 292 and 293. An extension 294 projects axially from the wall 280. The extension 294 carries a spring-biased detent 295 that extends alternately into spaced locating notches 296 in the piston rod 212. The detent 295 and notches 296 serve the same function as the detent 95 and locating notches or slots 96 of the first embodiment. The cylinder 275 also carries a yoke bracket 298, that carries a yoke 300 that corresponds to and operates in the same way as the yoke 75 of the first embodiment.

When hydraulic fluid under pressure is admitted through the line 292, the cylinder 275 is moved to the position shown in FIG. 8, where the tab 277 has engaged an arm of a limit switch 336, which is electrically connected to the intensifier to cut off the flow of fluid to the cylinder. When fluid is admitted through the line 293 to the other side of the cylinder, the cylinder moves in a direction toward the structure 268, forcing the detent 295 out of its seat notch 296, until the tab 277 engages an arm of a limit switch 337, which is coincident with the seating of the detent 295 in the outer of the notches 296, moving the spool until it is disengaged from the driving shaft 4 as in the case of the first embodiment.

Numerous variations in the construction of the device of this invention will become apparent to those skilled in the art in the light of the foregoing disclosure. Merely by way of example, the construction of the arms of the yoke can be different, in that the two arms can be made identical, or the lower arm can be provided with an extension passing beneath the piston, but thin enough to be passed between the platform and the piston to facilitate assembly. The configuration of the arms can be otherwise varied. A single, double acting cylinder can be used on either side. Although it is not customarily done that way, the spool and brackets can be reversed, disconnecting the driven shaft from the driving shaft by shifting the spool toward the driving shaft, the disadvantage being that the entire spool will continue to rotate with the driving shaft. These are merely illustrative.

Having thus described the invention, what is claimed and desired to be secured by Letters Patent is:

1. In a quick disconnect between a driving shaft and a driven shaft, in which a first annular bracket is mounted on an end of said driving shaft and a second annular bracket is mounted on an end of said driven shaft facing said first bracket but spaced substantially from said first bracket, each of said brackets having an inboard facing edge and radially inwardly, axially extending bracket splines, the bracket splines of one of said brackets being axially shorter than the bracket splines of the other, an axially elongated spool having annular flanges at each axial end extending radially outwardly and having radially outwardly extending splines complementary to said inwardly extending bracket splines, one of said annular flanges being associated with the bracket with the shorter bracket splines, said spool having an annular channel defined by spaced facing radial surfaces of spaced radially outwardly extending annular walls located intermediate said flanges, actuating rollers positioned in said channel between said annular channel-defining spaced radial facing surfaces, normally out of engagement with said radial facing surfaces, and means for moving said rollers axially against one of said radial facing surfaces facing the bracket with the shorter splines to move the spool axially from a position at which said flange splines of both flanges engage bracket splines of both brackets to a position at which said flange splines of the flange associated with said shorter bracket splines are moved axially inboard clear of said shorter bracket splines to disengage said flange splines from said shorter bracket splines, hence to disengage the driving shaft from the driven shaft, the improvement comprising a yoke having two substantially diametrically opposite, radially outwardly extending arms and an actuating roller-carrying section connected to said arms, said roller-carrying section extending around and within said channel between said channel-defining spaced radial facing surfaces and carrying two, diametrically opposed of said actuating rollers within said channel, said actuating rollers projecting axially beyond sides of said actuating roller-carrying section a distance less than the distance between said channel-defining spaced radial facing surfaces to permit said actuating rollers selectively to be positioned out of contact with said spaced radial facing surfaces and to be forced into engagement with one or the other of said spaced radial facing surfaces, said arms extending radially beyond the reach of said brackets, and said arms being operatively connected to means for moving said arms axially, said means for moving said arms axially comprising said means for moving said rollers axially and being positioned radially outboard of said brackets.

2. The improvement of claim 1 wherein said roller-carrying section of said yoke is made in at least two parts whereby the yoke can be assembled around said spool by positioning the parts on either side of said spool and securing the parts in assembled condition.

3. The improvement, of claim 1 wherein the driving shaft has the bracket with the axially shorter splines, whereby the driving shaft is disconnected from the driven shaft.

4. The improvement of claim 1 including two sets of arm moving means, one associated with each of said arms, said arm moving means being double acting fluid operated cylinders fixed against movement, and piston means mounted in and having a part extending from said cylinders, said piston means being moveable in response to the supplying of hydraulic fluid to said cylinder, to each of which piston means extending parts one of said arms is connected.

5. The improvement of claim 4 wherein the said fluid operated cylinder means are connected to intensifying means containing hydraulic fluid, said intensifying means being operated by air under pressure, a source of compressed air is connected to supply air to said intensifying means to provide hydraulic fluid to drive said cylinder means at pressure and quantity sufficient to move said spool to disengaging position in case of the failure of alternating current, direct operated value means for controlling the flow of air from said source to intensifying means, and a source of direct current selectively connected to energize said valve means.

6. The improvement of claim 1 including means for fixing the position of said arms at two axially spaced limits of their axial travel, said actuating roller-carrying section connected to said arms being so positioned that said roller-carrying section is spaced a sufficient distance from said spaced radial facing surfaces that when one of said arms is located at one of said limits and the other of said arms is located at the other of said limits, clearance remains between said roller-carrying section and said spaced radial facing surfaces.

7. The improvement of claim 6 including means carried by said spool for locating said spool alternately at connected and disconnected positions of said spool, said spool locating means being spaced to permit substantially the same amount of axial movement of the spool as the arm locating means permit axial movement of the arms.

8. In a quick disconnect between a driving shaft and a driven shaft, in which a first annular bracket is mounted on an end of said driving shaft and a second annular bracket is mounted on an end of said driven shaft facing said first bracket but spaced substantially from said first bracket, each of said brackets having a radially inwardly projecting lip and radially inwardly, axially extending bracket splines, the bracket splines of one of said brackets ending short of said lip, an axially elongated spool having annular flanges at each axial end, said flanges extending radially outwardly and having radially outwardly extending flange splines complementary to said inwardly extending bracket splines, one of said flanges being of an axial width less than the axial distance between said lip and the bracket splines that end short of said lip and being associated with the bracket having bracket splines ending short of said lip, said spool having an annular channel defined by spaced radial facing surfaces of spaced radially outwardly extending annular walls located intermediate said flanges, one of said spaced radial facing surfaces facing the bracket having said bracket splines ending short of said lip, actuating rollers positioned in said channel between said spaced radial facing surfaces, normally out of engagement with said spaced radial facing surfaces, and means for moving said rollers against the surface of the radially outwardly extending annular wall facing the bracket with the bracket splines ending short of the lip for moving the spool to a position at which the flange associated with said bracket having said bracket splines ending short of said lip moves into the space between said shorter bracket splines and said lip to disengage said flange splines from said shorter bracket splines, hence to disengage the driving shaft from the driven shaft, the improvement comprising a yoke extending around and within said spool channel between said channel-defining spaced radial facing surfaces but clear thereof, said yoke having two substantially diametrically opposite, radially outwardly extending arms and a roller-carrying section connected to said arms, said arms extending radially beyond the reach of said brackets, said arms being operatively connected to means for moving said arms axially, said means for moving said arms axially comprising said means for moving said rollers axially and being positioned outboard of said brackets.

9. In a quick disconnect between a driving shaft and a driven shaft, in which a first annular bracket is mounted on an end of said driving shaft and a second annular bracket is mounted on an end of said driven shaft facing said first bracket but spaced substantially from said first bracket, each of said brackets having an inboard facing edge and radially inwardly, axially extending bracket splines, the bracket splines of one of said brackets being axially shorter than the bracket splines of the other, a spool having annular flanges at each axial end extending radially outwardly and having radially outwardly extending flange splines complementary to said inwardly extending bracket splines, one of said flanges being associated with said bracket having the shorter bracket splines said spool having an annular channel defined by spaced radial facing surfaces of spaced radially outwardly extending annular walls located intermediate said flanges, actuating rollers positioned in said channel between said channel-defining spaced radial facing surfaces, normally out of engagement with said spaced radial facing surfaces, and means for moving said rollers axially against one of said spaced radial facing surfaces facing the bracket with the shorter bracket splines to move the spool to a position at which said flange splines of the flange associated with said shorter bracket splines move axially inboard clear of said shorter bracket splines to disengage said flange splines from said shorter bracket splines, hence to disengage the driving shaft from the driven shaft, the improvement comprising a yoke having an actuating roller-carrying section, said actuating roller-carrying section extending around and within said channel between said spaced radial facing surfaces but clear of said channel-defining spaced radial facing surfaces and carrying said actuating rollers within said channel, said actuating rol projecting axially beyond sides of said roller-carrying section a distance less than the span between said spaced radial facing surfaces to permit said actuating rollers selectively to be clear of and to be forced into engagement with one or the other of said spaced radial facing surfaces, and said means for moving said rollers axially against the radial facing surface facing the bracket with the shorter bracket splines to move the spool to a position at which flange splines of the flange associated with said shorter bracket splines move axially inboard clear of said shorter bracket splines to disengage said flange splines from said shorter bracket splines, hence to disengage the driving shaft from the driven shaft comprise roller-carrying section moving means connected to said roller-carrying section for moving said roller-carrying section axially.

10. The improvement of claim 9 wherein said means for moving said roller-carrying section axially comprises a moveable double acting fluid operated cylinder, and fixed piston means, having a piston part mounted in substantially fluid-tight relation to said cylinder intermediate ends of said cylinder and rod means projecting from said piston part, said rod means being connected to a member immovable with respect to said piston, said moveable cylinder moving axially in response to the supplying of hydraulic fluid to the cylinder, on one side or the other of said piston part, and means for connecting said cylinder to said roller-carrying section.

11. The improvement of claim 10 including a housing surrounding said quick disconnect and moveable axially with respect to the shafts.

12. The improvement of claim 11 wherein said rod means extends through an opening in a radially extending, axially end wall of said cowling surrounding said quick disconnect and moveable axially with respect to the shafts, said rod means being anchored axially outboard of said cowling in a member fixed against axial movement.

13. The improvement of claim 9 including a cowling surrounding said quick disconnect and moveable axially with respect to the driving and driven shafts.

14. In a quick disconnect between a driving shaft and a driven shaft, in which a first annular bracket is mounted on an end of said driving shaft and a second annular bracket is mounted on an end of said driven shaft facing said first bracket but spaced substantially from said first bracket, each of said brackets having an inboard facing edge and radially inwardly, axially extending bracket splines, the bracket splines of one of said brackets being axially shorter than the bracket splines of the other, a spool having annular flanges at each axial end extending radially outwardly and having radially outwardly extending flange splines complementary to said inwardly extending bracket splines, one of said annular flanges being associated with the bracket with the shorter bracket splines, said spool having an annular channel defined by spaced facing radial surfaces of spaced outwardly extending annular walls located intermediate said flanges, actuating rollers positioned in said channel between said annular channel-defining walls, normally out of engagement with said spaced radial facing surfaces, and means for moving said rollers axially against one of said spaced radial facing surfaces facing the bracket with the shorter splines to move the spool axially from a position at which flange splines of both flanges engage bracket splines of both brackets to a position at which flange splines of the flange associated with said shorter bracket splines move axially inboard clear of said shorter bracket splines to disengage said flange splines from said bracket splines, hence to disengage the driving shaft from the driven shaft, the improvement comprising a yoke having an actuating roller-carrying section extending around and within said channel between said channel-defining spaced radial facing surfaces but clear of said spaced radial facing surfaces and carrying said actuating rollers within said channel, said actuating rollers projecting axially beyond sides of said actuating roller-carrying section a distance less than the distance between said channel-defining spaced radial facing surfaces to permit said actuating rollers selectively to be spaced from said spaced radial facing surfaces and to be forced into engagement with one or the other of said spaced radial facing surfaces, said means for moving said actuating rollers axially comprising a hydraulic fluid operated cylinder and piston means operatively connected to said yoke for moving said yoke axially, said piston means having a piston mounted in substantially fluid-tight relation to and in said cylinder intermediate ends of said cylinder and rod means connected to said piston and projecting from said cylinder, at least one of said piston and cylinder moving axially relative to the other upon the admission of hydraulic fluid to the cylinder on one side or the other of the piston, said cylinder being connected to intensifying means containing hydraulic fluid, said intensifying means being operated by air under pressure, a source of compressed air connected to supply air to said intensifying means to provide hydraulic fluid to said cylinder at pressure and quantity sufficient to move said spool to disengaging position in case of the failure of alternating current, direct current operated valve means for controlling the flow of air from said source to said intensifying means, and a source of direct current selectively connected to energize said valve means.

15. The improvement of claim 14 wherein said cylinder comprises a moveable double acting fluid operated cylinder and said rod means is connected to a member immovable with respect to said piston, said moveable cylinder moving axially in response to the supplying of hydraulic fluid to the cylinder on one side or the other of said piston and said yoke being operatively connected to said cylinder.

* * * * *